United States Patent
Ito et al.

(10) Patent No.: US 10,552,368 B2
(45) Date of Patent: Feb. 4, 2020

(54) IN-VEHICLE CONTROL DEVICE

(71) Applicant: Hitachi Automotive Systems, Ltd., Hitachinaka-shi, Ibaraki (JP)

(72) Inventors: Shingo Ito, Hitachinaka (JP); Kosei Goto, Hitachinaka (JP); Takeshi Fukuda, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/744,166

(22) PCT Filed: Aug. 5, 2016

(86) PCT No.: PCT/JP2016/073030
§ 371 (c)(1),
(2) Date: Jan. 12, 2018

(87) PCT Pub. No.: WO2017/056725
PCT Pub. Date: Apr. 6, 2017

(65) Prior Publication Data
US 2018/0203823 A1    Jul. 19, 2018

(30) Foreign Application Priority Data
Sep. 30, 2015    (JP) ................................ 2015-192513

(51) Int. Cl.
*G06F 15/167*    (2006.01)
*B60W 50/04*    (2006.01)
(Continued)

(52) U.S. Cl.
CPC ........... *G06F 15/167* (2013.01); *B60W 50/04* (2013.01); *G06F 12/1081* (2013.01); *B60W 2050/0005* (2013.01)

(58) Field of Classification Search
CPC .... G06F 12/14; G06F 15/167; G06F 12/1081; G06F 12/1416; G06F 12/1483; B60R 16/02; B60W 50/04
See application file for complete search history.

(56) References Cited

U.S. PATENT DOCUMENTS 8,527,139 B1 *  9/2013  Yousuf ................ G06F 11/2242
                                                             180/65.1
2012/0330501 A1 * 12/2012 Sundaram .......... G05B 23/0248
                                                             701/33.9
(Continued)

FOREIGN PATENT DOCUMENTS

JP          63-165951 A      7/1988
JP         2012-128788 A     7/2012
(Continued)

OTHER PUBLICATIONS

International Search Report (PCT/ISA/210) issued in PCT Application No. PCT/JP2016/073030 dated Nov. 15, 2016 with English translation (4 pages).
(Continued)

*Primary Examiner* — Nimesh G Patel
(74) *Attorney, Agent, or Firm* — Crowell & Moring LLP

(57) ABSTRACT

Provided is an in-vehicle control device that allows the giving and receiving of data via inter-core communication at the timing of a user, as well as being capable of minimizing processing load while satisfying safety requirements of different functional safety levels in the inter-core communication of a multicore microcomputer. The data communication between a plurality of cores is performed by a writing means for writing the data of a core register into a region of a shared memory of the cores, where safety levels are set, using a hardware function. The cores have different functional safety levels.

2 Claims, 2 Drawing Sheets

(51) Int. Cl.
*G06F 12/1081* (2016.01)
*B60W 50/00* (2006.01)

(56) References Cited

U.S. PATENT DOCUMENTS

| | | | |
|---|---|---|---|
| 2014/0067192 A1* | 3/2014 | Yousuf | B60W 50/029 701/31.4 |
| 2014/0223047 A1* | 8/2014 | Chavali | G06F 13/1605 710/104 |
| 2015/0143332 A1* | 5/2015 | Thomas | G06F 8/10 717/120 |
| 2015/0175170 A1 | 6/2015 | Aoki | |
| 2015/0212952 A1* | 7/2015 | Wegner | G06F 12/1433 711/152 |
| 2015/0242233 A1 | 8/2015 | Brewerton et al. | |
| 2015/0254017 A1* | 9/2015 | Soja | G06F 3/0622 711/103 |
| 2015/0378341 A1* | 12/2015 | Kobayashi | G05B 19/19 700/186 |
| 2016/0328254 A1* | 11/2016 | Ahmed | G06F 9/45558 |
| 2016/0328272 A1* | 11/2016 | Ahmed | G06F 9/4881 |
| 2017/0282972 A1* | 10/2017 | Moretti | B62D 15/0265 |
| 2018/0105183 A1* | 4/2018 | Kollmer | B60W 50/0205 |

FOREIGN PATENT DOCUMENTS

| | | |
|---|---|---|
| JP | 2013-161299 A | 8/2013 |
| JP | 2014-193690 A | 10/2014 |
| JP | 2015-67107 A | 4/2015 |

OTHER PUBLICATIONS

Japanese-language Written Opinion (PCT/ISA/237) issued in PCT Application No. PCT/JP2016/073030 dated Nov. 15, 2016 (4 pages).
Extended European Search Report issued in counterpart European Application No. 16850902.4 dated Apr. 5, 2019 (six (6) pages).
European Office Action issued in counterpart European Application No. 16850902.4 dated Aug. 21, 2019 (five (5) pages).

* cited by examiner

IN-VEHICLE CONTROL DEVICE

TECHNICAL FIELD

The present invention relates to an in-vehicle control device.

BACKGROUND ART

In recent years, technical and functional requirements in in-vehicle control (function) are advanced and complicated. Functional safety (ISO26262) has been formulated in the automobile industry, and it is essential to deal with the functional safety also in in-vehicle control devices. Automotive safety integrity levels (ASIL) showing standards to be protected according to functions are set for the functional safety, and processing according to the ASIL is required for a function to be implemented (the ASIL are defined in five stages from quality management (QM) of a lowest safety level to the ASIL D of a highest safety level). For that reason, in recent years, since microcomputers need to correspond to not only the functions but also the ASIL, the number of processing to be executed further increases.

Under such circumstances, in order to deal with the continuously increasing number of processing, a microcomputer having a core (an execution unit of the processing) has been changed to a multicore microprocessor (having a plurality of cores), such that throughput of the microcomputer is improved and processing load is dispersed, and accordingly, the microcomputers gets high functionality.

However, since each core in the multicore microcomputer executes operation (processing) individually, when it is necessary to share information (data), the information (data) executed in each core needs to be put together in one core. In order to put the information together in the core, it is necessary to perform communication between the cores (hereinafter, inter-core communication). However, depending on away of use (control method) of the inter-core communication, throughput may be lower than that of a conventional single-core microcomputer.

For example, even when communication is to be performed in one core, in a case where another core is in processing, the communication may not be performed and processing may be delayed.

As a result, the delay of the processing in another core may lead to delay in whole processing, and the throughput may be lowered.

In addition, in order to satisfy the safety levels, it is necessary to ensure soundness of information (data) to be handled.

As described above, even when the multicore microcomputer satisfies the ASIL and the processing is distributed to a plurality of cores, the throughput may vary largely depending on how the inter-core communication is controlled. Therefore, how to implement the ASIL and the inter-core communication has been a major technical problem.

CITATION LIST

Patent Literature

PTL 1: JP 2014-193690 A

PTL 2: JP 2012-128788 A

SUMMARY OF INVENTION

Technical Problem

Under such circumstances, PTL 1 describes a technology in a case where multiple types of processing of different ASIL levels coexist in a microcomputer (one core).

For example, PTL 1 provides a technology for securing safety by monitoring access of each region by using a partitioning technology in order to mix software of quality management (QM) level (no safety requirement matters) and software of ASIL D level (highest safety requirement level) in the microcomputer.

However, in the technology of PTL 1, a situation in which a plurality of cores in the multicore microcomputer operates independently and the communication between the cores are not taken into consideration. Therefore, in this technology, there is a problem of increase in the processing load of the microcomputer at the time of inter-core communication (decrease in processing efficiency).

In addition, PTL 2 describes a technology of the inter-core communication in the multicore microcomputer.

However, the technology of PTL 2 does not provide a technology in a case where functional safety levels (ASIL) are satisfied. Therefore, there is a problem of securing safety during the inter-core communication such as from a low ASIL level to a high ASIL level.

In addition, there is AUTOSAR OS as an OS for in-vehicle control.

In this AUTOSAR OS, an inter-OS-application communicator (IOC) is provided as a function of the inter-core communication between cores having different ASIL levels.

However, since this function is controlled by the OS installed in each core, there has been a problem that processing load increases or inter-core communication cannot be made at the timing assumed by the user, for example, a start of the inter-core communication processing is delayed when overhead of processing time due to processing by the OS is occurred or processing under execution of the OS is delayed.

Accordingly, an object of the present invention is to provide a technology which allows giving and receiving of data via inter-core communication at the timing of a user, as well as minimizing processing load while satisfying safety requirements of different (lowest to highest) functional safety levels (ASIL) in the inter-core communication of a multicore microcomputer.

Solution to Problem

The above object can be achieved by the invention described in the claims.

Advantageous Effects of Invention

According to the present invention, in inter-core communication of a multicore microcomputer, processing load can be minimized while satisfying safety requirements of different (lowest to highest) functional safety levels (ASIL), and at the same time, giving and receiving of the data can be performed via the inter-core communication at the timing of a user.

DESCRIPTION OF EMBODIMENTS

Hereinafter, an embodiment of the present invention will be described with reference to the drawings.

Note that, in the following embodiment, QM is treated as "no safety requirement" and ASIL is treated as "safety requirement is present".

First Embodiment

A configuration of a multicore micro control unit (MCU) 1 according to the present embodiment will be described with reference to FIG. 1.

Figure 1:
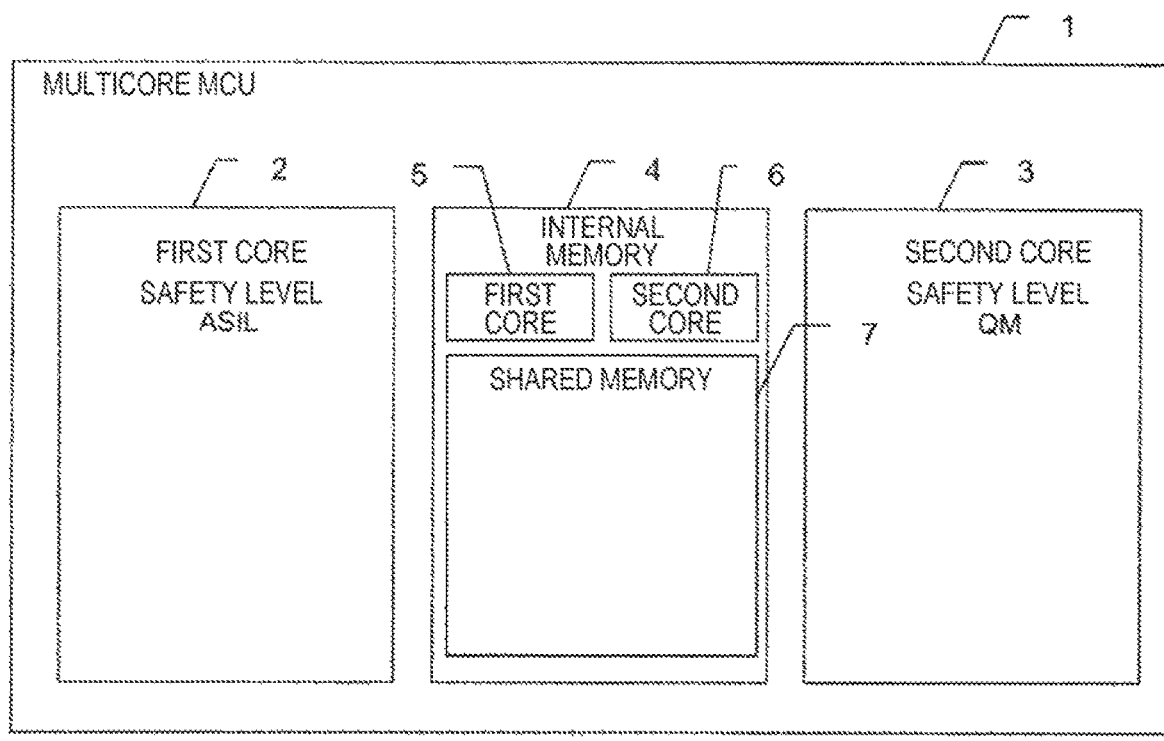
FIG. 1 is a core configuration diagram of a multicore microcomputer according to the present embodiment.

FIG. 1 illustrates the configuration of the multicore MCU 1. The multicore MCU 1 is equipped with a first core 2 that executes processing with a safety level of ASIL and a second core 3 that executes processing with a safety level of QM. An internal memory 4 includes a first core internal memory 5, a second core internal memory 6, and a shared memory 7 which can be commonly used by each core.

Note that the two cores are provided in the present embodiment, but two or more cores may be provided. In addition, although the safety level of each core is ASIL or QM, multiple types of processing of different safety levels may be defined in processing within the core.

Note that, in the present embodiment, each of a ROM and a RAM will be described as a memory without differentiating each other.

Next, a data management method between the cores (the different safety levels) will be described with reference to FIG. 2. The shared memory 7 is used for giving and receiving of the data between the cores. However, when the shared memory is used as it is, pieces of data of different safety levels are mixedly handled. Accordingly, there is a possibility that the safety requirement is not satisfied.

Therefore, in the shared memory, a memory region corresponding to the safety level of each core is prepared. An ASIL region 8 for ASIL processing and a QM region 9 for QM processing are defined. However, since the QM processing can access the ASIL region 8 only by defining the region, access restriction is set for the defined memory region using a function of a memory protection unit (MPU) 10.

In this manner, by setting the access restriction by the MPU 10, the safety requirement of each memory region can be satisfied.

Although the data management method between the cores has been described using the internal memory in the multicore MCU 1 in the present embodiment, the present invention is not limited to the use of the internal memory. In addition, the shared memory is used for giving and receiving of data between the cores, but the present invention is not limited to the use of the shared memory, and a storage medium such as an external memory dedicated to each core may be provided.

Next, with reference to FIG. 3, a method of giving and receiving data from a core of a low safety level to a core of a high safety level (the QM to the ASIL in the present embodiment) will be described.

Note that the data handled in the present embodiment is not data created by software processing. Register values of AD conversion, CAN communication and the like and a value not created in the software processing stored in a communication buffer (second core processing register/communication buffer 11) are handled as data.

In a case where data to be processed by the second core 3 is transmitted to the first core 2, the data is normally copied to the QM region 9 of the shared memory 7 in the software processing. However, in the present technology, the data of the second core 3 is directly copied to the ASIL region 8 of the shared memory 7 by using a communication (transfer) function of hardware such as direct memory access (DMA) in step S1. With this configuration, the data can be copied safely to the memory region with a high safety level without using software having a core with a lower safety level of the transfer destination.

In the present embodiment, data is transferred by using the DMA, but any means may be used as long as it is a means capable of transferring data directly from a region such as a register and a buffer, that is, a method capable of transferring data without passing through user software.

Thereafter, the first core 2 can access the ASIL region 8, which is a memory region managed by the first core 2 itself in step S2, to acquire data.

Next, a processing flow in a case where the processing is executed with the configuration of FIG. 3 will be described with reference to FIG. 4.

In step S3, processing such as the AD conversion and the CAN communication in the second core 3 is executed, and in step S4, values of results (processing) of AD conversion, CAN communication and the like are stored in the register and the communication buffer.

The values stored in the register and the communication buffer are transferred using DMA transfer of step S5, and in step S6, the values are directly stored (written) in the ASIL region in a shared memory region in the internal memory. In step S6, the values stored in the ASIL region in the shared memory region in the internal memory are read into the first core 2 in step S7. In step S8, the values read in S7 are stored in the internal memory used in the execution of the processing in the first core 2, in step S9, the processing in the first core 2 is executed, and the processing is terminated.

In a case where giving and receiving of the data are performed between the cores by processing on the software of the transfer destination with a low safety level without using this technology, the core with a high safety level needs to check and/or monitor safety of the data given and received with the low safety level. Therefore, processing load may increase or the giving and receiving of the data may not be performed at an arbitrary timing.

As described above, when a data transfer source performs the giving and receiving of the data between the core with the lower safety level than the safety level of the transfer destination security level and the core of the high safety level, the data is copied to a data region of the core with the high safety level using a hardware function without using software having the core with the low safety level. With this configuration, safe and high-speed giving and receiving of the data can be achieved.

In addition, since the data is not transferred via the software processing, the giving and receiving of the data can be performed without being affected by an OS or the like.

Note that the configuration of the multicore MCU 1 of FIG. 1 described in the present embodiment is merely an example, and does not limit the number of cores, memory configuration, functions, and the like.

Figure 2:
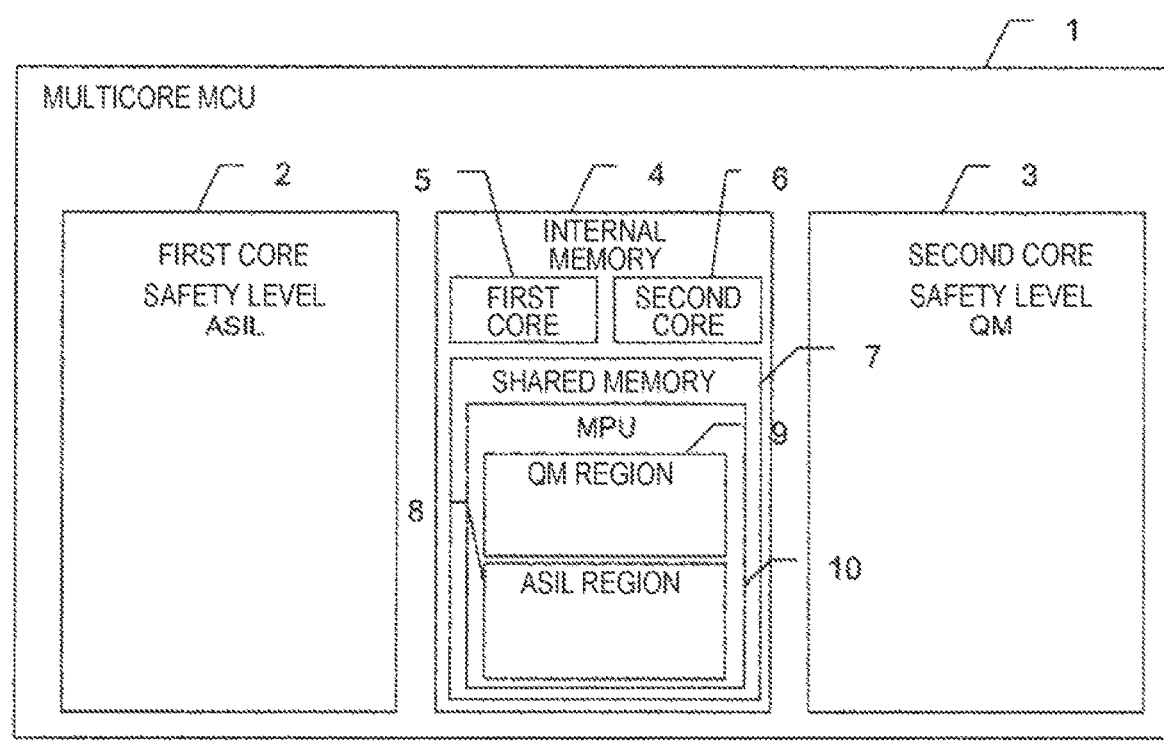
FIG. 2 is a configuration diagram of inter-core communication with different ASIL levels according to the present embodiment.
Figure 3:
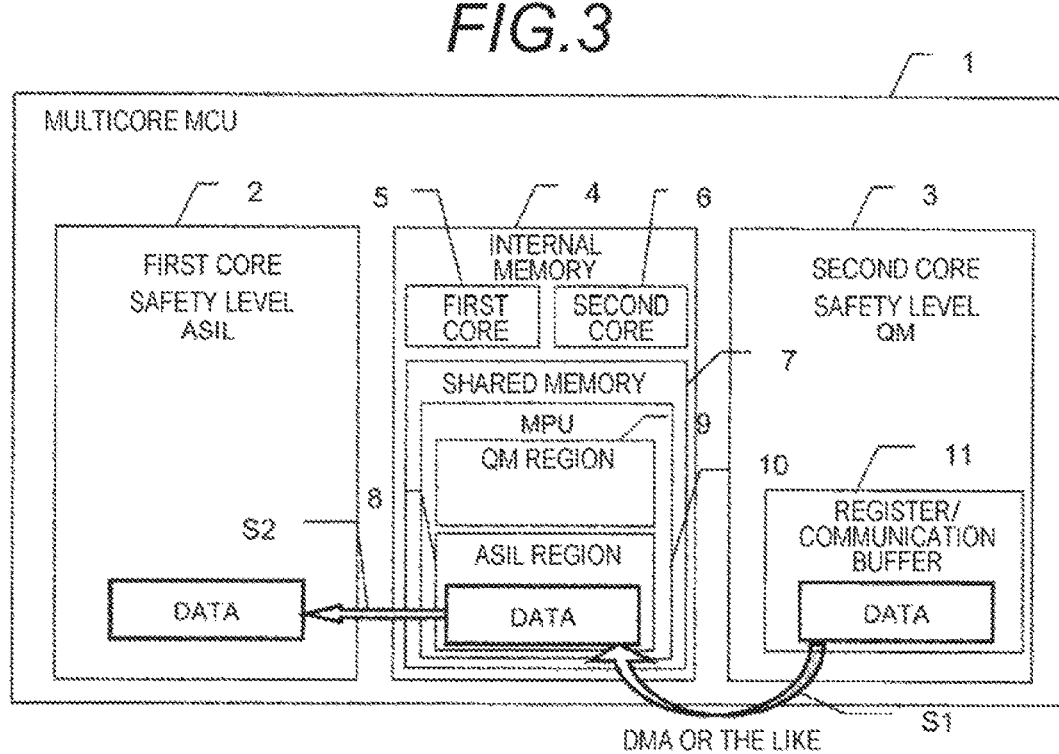
FIG. 3 is a configuration diagram of a processing example of inter-core communication in a case where the present embodiment is used.
Figure 4:
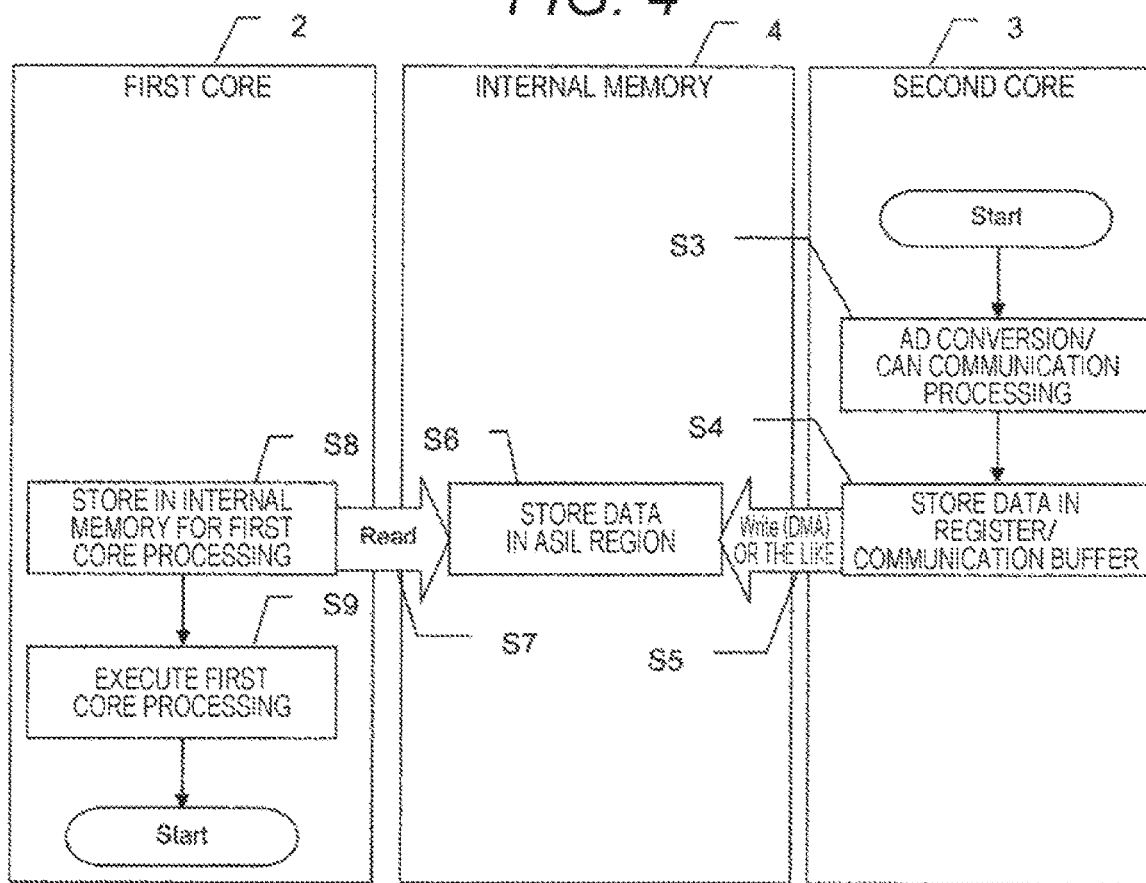
FIG. 4 is a processing flow diagram of inter-core communication in which the present embodiment is used.

In addition, the configurations and processing contents illustrated in FIGS. 2, 3 and 4 are merely examples of processing, and as long as contents of the present embodiment such as a data transfer means and a storage location can be satisfied, a means and a configuration are not limited.

REFERENCE SIGNS LIST 1 multicore MCU
2 first core
3 second core
4 internal memory
5 first core internal memory
6 second core internal memory
7 shared memory
8 ASIL region
9 QM region
10 MPU
11 second core processing register/communication buffer

The invention claimed is:

1. An in-vehicle control device, comprising:
a multicore microcomputer including a first core and a second core with a shared memory disposed between, and shared by, the first core and the second core; wherein
the shared memory has separate memory regions for the first core and the second core, the separate memory regions having safety levels corresponding to the first core and the second core;
data communication between the first core and the second core is performed by a writing means for writing data of a core register into one of the separate memory regions of the shared memory, where the safety levels are set, using a hardware function;
the first and the second core have different functional safety levels;
the first core is assigned with an ASIL function;
the second core is assigned with a QM function; and
the writing means writes data from the second core directly to an ASIL region of the separate memory regions of the shared memory using the hardware function when communicating from the second core to the first core.

2. The in-vehicle control device according to claim 1, wherein
the hardware function is direct memory access.

* * * * *